(12) United States Patent
Vinyard

(10) Patent No.: US 10,048,667 B1
(45) Date of Patent: Aug. 14, 2018

(54) KNOB FOR AN ELECTRIC MIXER

(71) Applicant: Brandon Vinyard, Southfield, MI (US)

(72) Inventor: Brandon Vinyard, Southfield, MI (US)

(73) Assignee: Brandon Vinyard, Southfield, MI (US)

( * ) Notice: Subject to any disclaimer, the term of this patent is extended or adjusted under 35 U.S.C. 154(b) by 0 days.

(21) Appl. No.: 15/655,044

(22) Filed: Jul. 20, 2017

(51) Int. Cl.
| | |
|---|---|
| *H04B 1/00* | (2006.01) |
| *G05B 19/042* | (2006.01) |
| *G11B 27/038* | (2006.01) |
| *G11B 27/34* | (2006.01) |
| *H04S 1/00* | (2006.01) |
| *H04H 60/04* | (2008.01) |

(52) U.S. Cl.
CPC .......... *G05B 19/042* (2013.01); *G11B 27/038* (2013.01); *G11B 27/34* (2013.01); *H04H 60/04* (2013.01); *H04S 1/007* (2013.01); *G05B 2219/23023* (2013.01); *G05B 2219/23379* (2013.01)

(58) Field of Classification Search
CPC ........ G05B 19/042; G05B 2219/23023; G05B 2219/23379; G11B 27/038; G11B 27/34; H04H 60/04; H04S 1/007
USPC .......................................... 381/119, 123, 124
See application file for complete search history.

(56) References Cited

U.S. PATENT DOCUMENTS

| | | | |
|---|---|---|---|
| 4,486,630 A | * | 12/1984 | Fetchko .................... H01H 3/14 200/52 R |
| 4,865,610 A | * | 9/1989 | Muller ...................... G05G 1/52 623/24 |
| 5,177,801 A | | 1/1993 | Shoda et al. |
| 5,317,641 A | | 5/1994 | Yasuda et al. |
| 5,402,501 A | | 3/1995 | Silfvajt et al. |
| 5,444,676 A | | 8/1995 | Balsamo et al. |
| 5,488,669 A | | 1/1996 | Zampini et al. |
| 5,530,765 A | | 6/1996 | Zampini et al. |
| 5,608,807 A | | 3/1997 | Brunelle |
| 5,623,551 A | | 4/1997 | East et al. |
| 5,930,375 A | | 7/1999 | East et al. |
| 5,959,610 A | | 9/1999 | Silfvast |
| 6,301,365 B1 | | 10/2001 | Yamada et al. |
| 6,438,241 B1 | | 8/2002 | Silfvast et al. |
| 7,183,538 B2 | | 2/2007 | Minokami et al. |
| 7,442,609 B2 | | 10/2008 | Wang et al. |
| 7,929,717 B2 | | 4/2011 | Okabayashi et al. |
| 8,153,881 B2 | | 4/2012 | Coppard et al. |
| 8,300,852 B2 | | 10/2012 | Terada |
| 8,611,562 B2 | | 12/2013 | Cooper |
| 8,687,825 B2 | | 4/2014 | Okabayashi |

(Continued)

OTHER PUBLICATIONS

Rob, N-Control Avenger, p. 1-2 (Year: 2011).*

*Primary Examiner* — William A Jerez Lora
(74) *Attorney, Agent, or Firm* — Fishman Stewart PLLC

(57) ABSTRACT

A mixer controller includes a housing for audio processing equipment having a device surface and a front edge, and a plurality of audio processing devices mounted on the device surface. The plurality of audio processing devices include at least a first channel and a second channel. The mixer controller includes a cross-fader that controls an amount of audio output from the first channel and output from the second channel by sliding the cross-fader between a first position and a second position. The cross-fader includes an extension, the extension having an end that extends forward of the front edge of the housing.

20 Claims, 3 Drawing Sheets

(56) References Cited

U.S. PATENT DOCUMENTS

| | | |
|---|---|---|
| 9,564,982 B2 | 2/2017 | Ito |
| 2001/0028721 A1 | 10/2001 | Stavrou |
| 2002/0159375 A1 | 10/2002 | Eguchi et al. |
| 2005/0259532 A1* | 11/2005 | Roman ................ G11B 27/038 369/47.1 |
| 2010/0266147 A1 | 10/2010 | Radford |
| 2011/0130200 A1 | 6/2011 | Terada et al. |
| 2012/0023406 A1 | 1/2012 | Fujita et al. |
| 2014/0126750 A1 | 5/2014 | Kitayama et al. |
| 2016/0378428 A1 | 12/2016 | Jacuzzi |

* cited by examiner

KNOB FOR AN ELECTRIC MIXER

BACKGROUND

Electronic mixers are typically used in the entertainment industry, in which a disc jockey or "DJ" mixes outputs of two electronic channels into a single musical rhythm for entertainment purposes. Typically, a 2-channel mixer or "DJ mixer" includes various switches, buttons, and/or knobs for adjusting sound quality in each of the channels. Adjustment may include equalization to adjust or alter sound quality to emphasize or de-emphasize aspects of the audio signal, such as boosting high frequencies in some cases, and/or reducing low frequencies. In addition, each channel may include a turntable having its own stylus, otherwise referred to as a needle, which is used to ride within grooves of an LP record to play the recordings on the LP record.

A DJ mixer typically includes two turntables, each turntable having its own stylus, which can provide audio input to each of the respective channels of the 2-channel mixer. However, as is known, LPs or albums are designed to spin at a fixed rate of speed to accurately reproduce the audio recordings. For instance, traditionally 78 revolutions per minute (RPM), 33⅓ RPM, and 45 RPM were commonly used rotational speeds for LP or record players.

In recent years, DJs have taken to generating audio signals using LPs placed on turntables as a hip-hop or rap genre using a DJ mixer. In such a genre, instead of activating each of the turntables to rotate at a speed corresponding with the originally recorded music, each turntable may be manually rotated in rapid forward and backward rotational directions to generate short, rhythmic bursts of audio sound. In hip-hop parlance this may typically be referred to as turntablism, scratching, or beatboxing.

For instance, turntablism may be referred to as the art of manipulating sounds and creating new music, sound effects, mixes and other creative sounds and beats, typically by using two or more turntables and a cross-fader-equipped DJ mixer. The DJ mixer is plugged into a Public Address (PA) or other sound amplification system for live events or for broadcasting. Turntablists manipulate records on one or both turntables by moving the record with their hand to cue the stylus to desired points on a record, and by touching or moving the platter or record to stop, slow down, speed up or, spin the record backwards, or moving the turntable platter back and forth, as mentioned.

Typically, a DJ mixer uses a cross-fader control, and the mixer's gain and equalization adjusts the sound qualify and level of each turntable. A cross-fader on a DJ mixer essentially functions like two faders connected side-by-side, but in opposite directions. A cross-fader is typically mounted horizontally, so that the DJ can slide the fader from the extreme left (this provides 100% of a first sound source) to the extreme right (this provides 100% of a second sound source), move the fader to the middle (for a 50/50 mix of sources A and B, as an example), or adjust the fader to any point in between.

Thus, the cross-fader allows a DJ to fade one source out while fading another source in at the same time. This is useful when beatmatching two sources of audio (or more, where channels can be mapped to one of the two sides of the cross-fader individually) such as phonograph records (LPs), compact discs or digital sources. The technique of cross-fading is also used in audio engineering as a mixing technique, in which a mix engineer will often record two or more takes of a vocal or instrumental part and create a final version which is a composite of the best passages of these takes by cross-fading between each track.

However, during live performances or live broadcasts, the DJ typically uses both hands to rapidly move between each turntable and to the various switches, buttons, and knobs to adjust sound quality. Simultaneously, though, the DJ may wish to slide the fader from side to side to fade in and out each of the channels to fine-control sound quality between the two channels. The DJ's hands, however, are typically occupied and not readily available to slide the cross-fader while the several other activities are going on. Thus, DJs have been known to employ other techniques to slide the cross-fader, such as contorting their body to move the cross-fader so that their hands can remain free to perform other functions, as discussed. The cross-fader switch, however, is typically located on a top surface of the mixer, and is thus not conveniently located for adjustment with their body.

Accordingly, there is a need for an improved method and apparatus for adjusting a cross-fader switch on a DJ mixer.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a mixer controller according to the disclosure.

Figure 1:
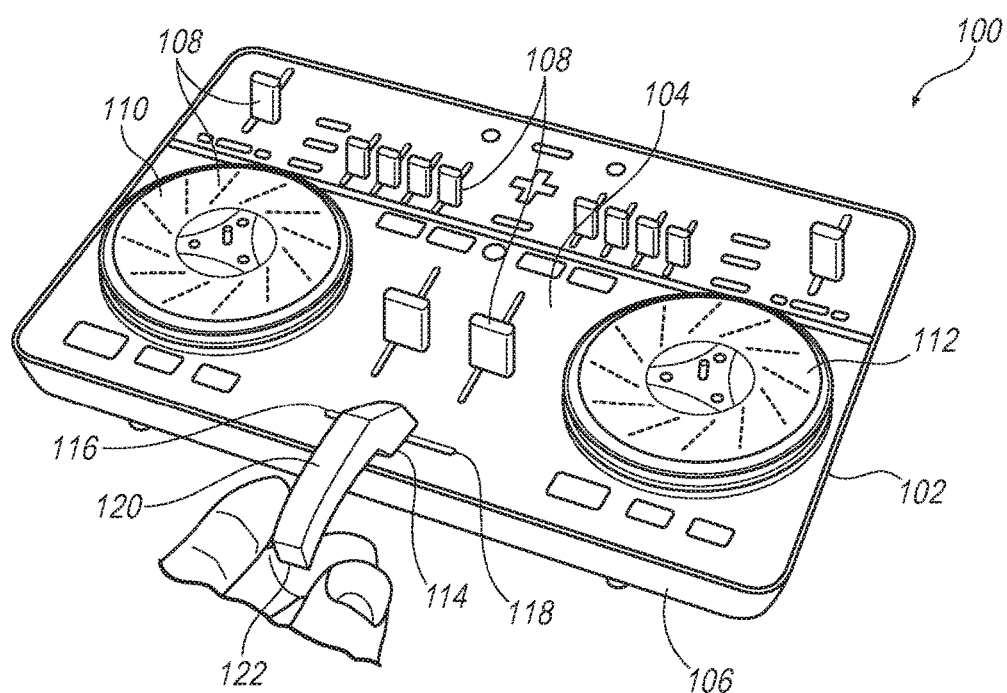
FIG. 1 is a perspective view of an exemplary mixer controller.

Turning now to FIG. 1, a mixer controller 100 includes a housing 102 for audio processing equipment having a device surface 104 and a front edge 106. A plurality of audio processing devices 108 are mounted on the device surface 104. The plurality of audio processing devices include at least a first audio channel input 110 and a second audio channel input 112. A cross-fader or cross-fader toggle 114 controls an amount of acoustic output between first channel input 110 and second audio channel input 112 by sliding cross-fader 114 between a first position 116 and a second position 118, and at any position therebetween. Cross-fader 114 includes an extension 120 having an end 122 that extends forward of front edge 106 of housing 102.

Cross-fader 114 extends forward of front edge 106 of housing 102 such that end 122 of cross-fader 114 can be engaged, between first position 116 and second position 118, by a body of a person operating the mixer controller.

Figure 2:
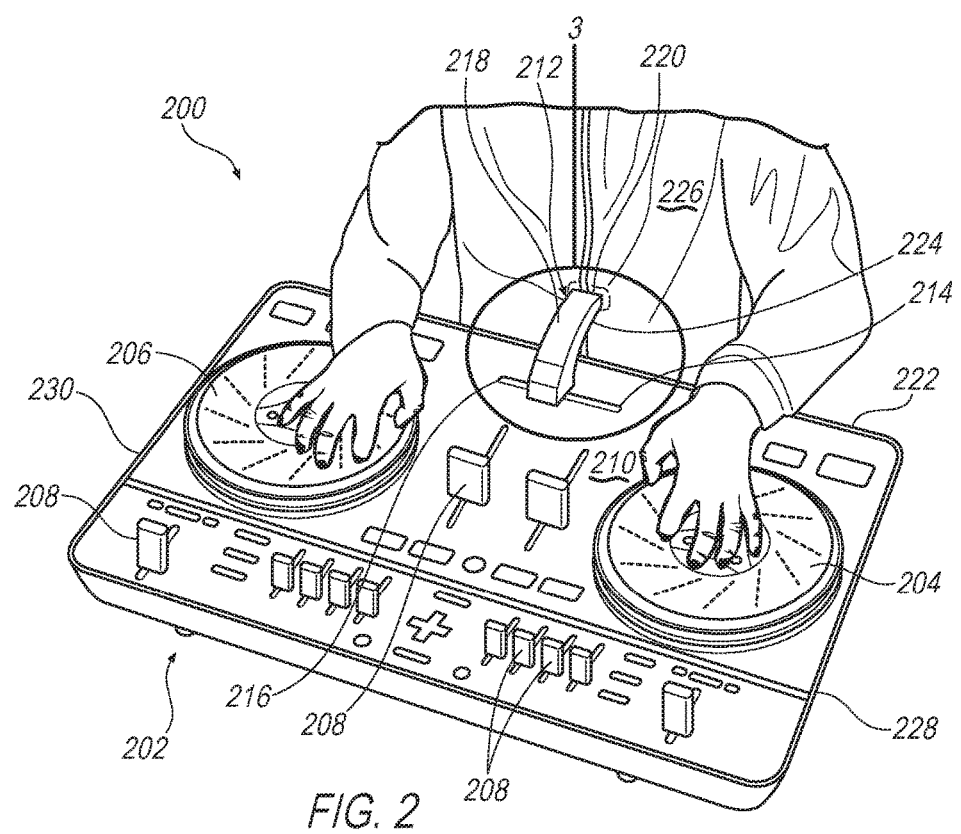
FIG. 2 illustrates another exemplary mixer controller, and in operation by an operator.

For instance, referring to FIG. 2, in an alternate exemplary arrangement 200 includes a mixer controller 202 having a first channel input 204 and a second channel input 206, as well as a plurality of knobs and switches (or audio processing devices) 208. Mixer controller 202 includes a device surface 210 having knobs and switches 208 thereon. A cross-fader 212 controls an amount of acoustic output between first channel input 204 and second channel input 206 by sliding cross-fader 212 between a first position 214 and a second position 216. Cross-fader 212 includes an extension 218 having an end 220 that extends forward of a front edge 222 of housing mixer controller 202.

In the disclosed example of FIGS. 1 and 2, the respective device surfaces are a top surface of the mixer controller 100, 202, and thus extension 120, 218 extends in front of or beyond respective edges 106, 222. It is contemplated, however, that devices 108, 208 may be placed on other surfaces that are accessible by a person operating mixer controller 100, 202.

According to the disclosure, referring still to FIG. 2, cross-fader 212 extends from device surface 210 and is arcuately shaped 224 having end 220 that extends forward of front edge 222 of mixer controller 202.

Referring still to FIGS. 1 and 2 for illustration purposes, mixer controller 100 includes housing 102 for audio processing equipment having a device surface, such as device surface 210 of FIG. 2, and front edge 106, 222. Audio processing devices 108, 208 are mounted on device surface 210. Audio processing devices 108, 208 include at least first channel input 110, 204 and second channel input 112, 206. Cross-fader 114, 212 controls an amount of audio output from first channel 110, 204 and output from second channel 112, 206 by sliding cross-fader 114, 212 between first position 116, 214 and second position 118, 216. Cross-fader 114, 212 includes an extension, such as extension 120, extension 120 having end 122 that extends forward of front edge 106 of the housing.

Figure 3:
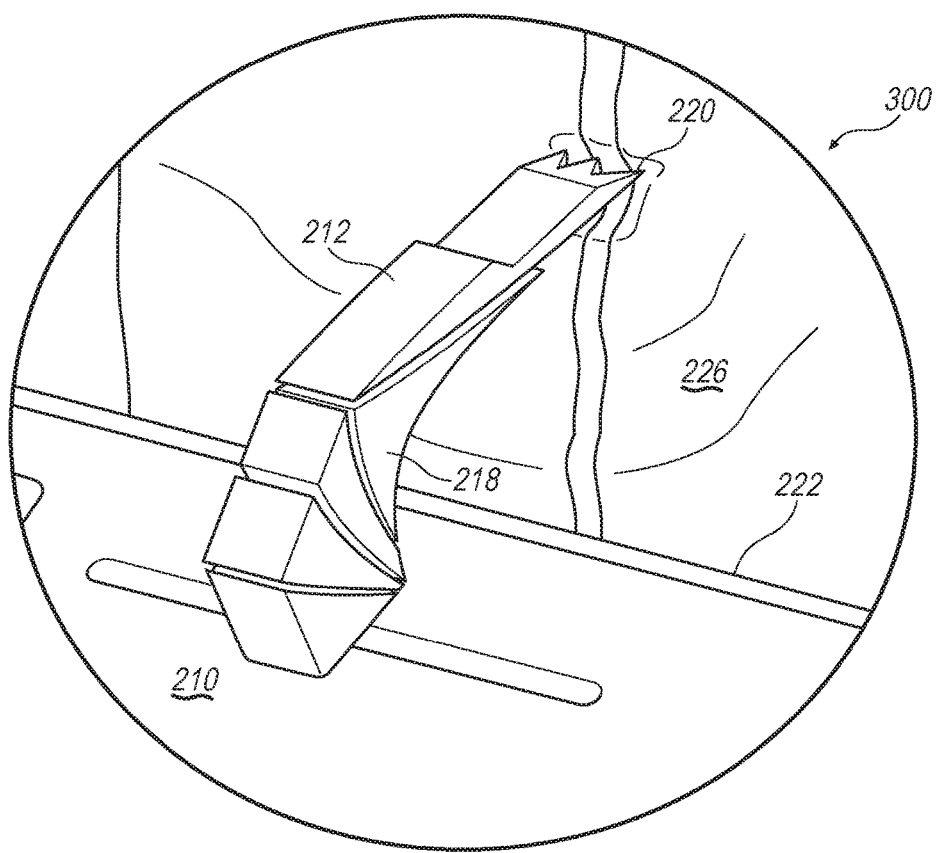
FIG. 3 shows a portion of the cross-fader illustrated in FIG. 2.

FIG. 3 illustrates a portion 300 of that illustrated in FIG. 2, to include cross-fader 212 that is positioned to slide side-to-side, and having end 220 that extends beyond edge 222, such that operator 226 may operate cross-fader 212 by sliding it side-to-side using their body, as disclosed herein.

During operation, end 122 of cross-fader 114 is engageable between first position 116 and second position 118 by a body of a person operating the mixer controller. Or, referring to FIG. 2, an operator or person 226 positions him or herself proximate mixer controller 202, and operator 226 is able to operate first and second channel inputs 204, 206 which, in the illustrated example, are turntables that each may have an LP thereon. Operator 226 may be a DJ or turntablist who is engaging in a live musical event or in a musical recording. End 220 and at least a portion of extension 218 extends beyond front edge 222 such that operator 226 may position their body in contact with end 220 during operation of mixer controller 202. And, although extension 218 is shown extending from a top of mixer controller 202 (i.e., device surface 210), it is contemplated that any knob that may be desired to be moved that is part of mixer controller 202 may include an extension that extends beyond front edge 222.

Cross-fader 212 extends from device surface 210 and is arcuately shaped 224 having end 220 that extends forward of front edge 220 of the housing. In one example, front end 222 extends from a first side 228 of mixer controller 202 to a second side 230 of mixer controller 202. Cross-fader 212 slides, in the illustrated example, in a direction extending from first side 228 to second side 230. In another example, when cross-fader 212 is in first position 214, then all audio output from first channel 204 is output from mixer controller 202, and when cross-fader 212 is in second position 216, then all audio output from second channel 206 is output from mixer controller 202. As illustrated and in one example, first channel 204 and second channel 206 are manually operable, and in one example, one or both are a turntable having a rotational center for rotating albums or LP records thereon. Audio processing devices 208 include manual levers, knobs, or adjustments to sound quality and characteristics with manually operable switches to either of first channel 204 and second channel 206.

Disclosed herein is a method of modifying a mixer controller. As known, a mixer controller, illustrated in FIGS. 1 and 2, may be manufactured or fabricated having a knob or toggle switch that simply extends off of a surface, such as surface 210 of FIG. 2. Thus, according to the disclosure a mixer controller that is fabricated with such a 'conventional' knob or toggle may be modified such that it includes an end that extends beyond an edge of the mixer controller, such as described with respect to FIGS. 1 and 2 above. For instance, audio processing equipment such as mixer controller 100 of FIG. 1 or mixer controller 202 of FIG. 2, may each include a device surface and a front edge as described, with audio processing devices 108, 208 mounted on the device surface. Audio processing devices 108, 208 include first channel 110, 204, second channel 112, 206, and a cross-fader such as cross-fader 114, 212 that controls an amount of acoustic output between first channel 110, 204 and from second channel 112, 206 by sliding cross-fader 114, 212 between first position 116, 214 and second position 118, 216. The method includes attaching an extension to the cross-fader, such as extension 120 or 218. Extension 120, 218 includes an end 122, 220 that extends beyond the front edge 106, 222 of the housing. The method further includes attaching extension 120, 218 such that end 122, 220 of can be engaged between first position 116, 214 and second position 118, 216 by a body of a person operating the mixer controller. And, a mixer may have an existing knob replaced or modified with the disclosed knob by pulling the existing knob with a firm pull of the cross-fader and replacing the existing knob with the disclosed knob.

Disclosed as well is a method of operating a mixer controller, such as that disclosed in FIGS. 1 and 2, that includes controlling an acoustic input into a first channel and to a second channel, and adjusting an amount of acoustic output from the first channel and from the second channel by manually moving an extension of a cross-fader that extends forward of a front edge of the mixer controller.

As such, it is contemplated, according to the disclosure, that a mixer controller may include as a new product, or be modified after its initial fabrication, such that a cross-fader has an end that extends beyond an edge of the mixer controller. As such, during live performances or live broadcasts, the DJ may operate the cross-fader with their body, allowing to commit both hands to rapidly move between each turntable and to the various switches, buttons, and knobs to adjust sound quality. That is, simultaneously the DJ may slide the fader from side to side to fade in and out each of the channels to fine-control sound quality between the two channels, without having to use one or both hands to do so.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A mixer controller, comprising:
a housing for audio processing equipment having a device surface and a front edge;
a plurality of devices mounted on the device surface, the plurality of devices including at least a first audio channel input and a second audio channel input; and
a cross-fader that controls an amount of audio output from the first audio channel input and output from the second audio channel input by sliding the cross-fader between a first position and a second position, the cross-fader having an extension, the extension having an end that extends forward of the front edge of the housing;
wherein the end of the cross-fader is engageable between the first position and the second position by a body of a person operating the mixer controller, while the hands of the person move between the plurality of devices on the device surface to adjust an amount of acoustic output from at least the first audio channel input and the second audio channel input.

2. The mixer controller of claim 1, wherein the device surface is a top surface of the mixer controller.

3. The mixer controller of claim 2, wherein the cross-fader extension extends from the device surface and is arcuately shaped having the end that extends forward of the front edge of the housing.

4. The mixer controller of claim 1, wherein the front ledge extends from a first side of the mixer controller to a second side of the mixer controller, and the cross-fader slides in a direction extending from the first side to the second side.

5. The mixer controller of claim 1, wherein when the cross-fader is in the first position, then all audio output from the first audio channel input is output from the mixer controller, and when the cross-fader is in the second position, then all audio output from the second audio channel input is output from the mixer controller.

6. The mixer controller of claim 1, wherein the first audio channel input and the second audio channel input are manually operable.

7. The mixer controller of claim 6, wherein one of the first audio channel input and the second audio channel input is a turntable.

8. The mixer controller of claim 6, wherein the plurality of devices include manual adjustments to sound quality and characteristics with manually operable switches to either of the first audio channel input and the second audio channel input.

9. A method of modifying a mixer controller, comprising:
providing audio processing equipment having a device surface and a front edge, and devices mounted on the device surface, the devices including a first audio channel input, a second audio channel input, and a cross-fader that controls an amount of acoustic output between the first audio channel input and from the second audio channel input by sliding the cross-fader between a first position and a second position; and
attaching an extension to the cross-fader, the extension having an end that extends beyond the front edge of the housing;
wherein the end of the cross-fader is engageable between the first position and the second position by a body of a person operating the mixer controller when both hands of the person move between the plurality of devices on the device surface to adjust an amount of sound from at least the first audio channel input and the second audio channel input.

10. The method of claim 9, wherein the device surface is a top surface of the mixer controller.

11. The method of claim 10, wherein the cross-fader extension extends from the device surface and is arcuately shaped having the end that extends forward of the front edge of the housing.

12. The method of claim 9, wherein the front edge extends from a first side of the mixer controller to a second side of the mixer controller, and the cross-fader slides in a direction extending from the first side to the second side.

13. The method of claim 9, wherein when the cross-fader is in the first position, then all acoustic output of the first audio channel input is output from the mixer controller, and when the cross-fader is in the second position, then all acoustic output of the second audio channel input is output from the mixer controller.

14. The method of claim 9, wherein the first audio channel input and the second audio channel input are manually operable.

15. A method of operating a mixer controller, comprising:
controlling an acoustic input into a first audio channel input and to a second audio channel input;
adjusting an amount of acoustic output from the first audio channel input and from the second audio channel input by manually moving an extension of a cross-fader that extends from a device surface of the mixer controller and extends forward of a front edge of the mixer controller;
moving the first audio channel input and the second audio channel input using both hands of a person operating the mixer controller; and
simultaneously moving an end of the extension of the cross-fader using a body, and not the hands, of the person operating the mixer controller, to adjust an amount of acoustic sound from the first audio channel input and from the second audio channel input.

16. The method of claim 15, wherein the device surface is a top surface of the mixer controller.

17. The method of claim 16, wherein:
the cross-fader extension extends from the device surface and is arcuately shaped having the end that extends forward of the front edge of the housing; and
the front edge extends from a first side of the mixer controller to a second side of the mixer controller, and the cross-fader slides in a direction extending from the first side to the second side.

18. The mixer controller of claim 1, wherein the plurality of devices includes knobs and switches on the device surface.

19. The method of claim 9, wherein the devices includes knobs and switches on the device surface.

20. The method of claim 15, further comprising moving knobs and switches on the device surface while simultaneously moving the end of the extension of the cross-fader using the body of the person operating the mixer controller.

* * * * *